United States Patent
Heitz et al.

(10) Patent No.: US 12,486,358 B2
(45) Date of Patent: Dec. 2, 2025

(54) METHOD FOR THE PRODUCTION OF A COLORED POLYOXYMETHYLENE COPOLYMER

(71) Applicants: BASF SE, Ludwigshafen am Rhein (DE); Kolon Plastics Inc., Gwacheon-Si (KR)

(72) Inventors: Thomas Heitz, Ludwigshafen am Rhein (DE); Jürgen Demeter, Ludwigshafen am Rhein (DE); Jin-Sang Choi, Gimcheon (KR)

(73) Assignees: BASF SE, Ludwigshafen am Rhein (DE); KOLON PLASTICS, INC., Gwacheon-Si (KR)

( * ) Notice: Subject to any disclaimer, the term of this patent is extended or adjusted under 35 U.S.C. 154(b) by 1051 days.

(21) Appl. No.: 17/054,144

(22) PCT Filed: May 8, 2019

(86) PCT No.: PCT/EP2019/061880
§ 371 (c)(1),
(2) Date: Nov. 9, 2020

(87) PCT Pub. No.: WO2019/215266
PCT Pub. Date: Nov. 14, 2019

(65) Prior Publication Data
US 2021/0214494 A1  Jul. 15, 2021

(30) Foreign Application Priority Data
May 9, 2018  (EP) .................... 18171636

(51) Int. Cl.
*C08G 65/16* (2006.01)
*C08K 3/04* (2006.01)

(52) U.S. Cl.
CPC ............... *C08G 65/16* (2013.01); *C08K 3/04* (2013.01)

(58) Field of Classification Search
CPC .......... C08G 65/16; C08K 3/04; C08K 3/013; C08L 59/04
See application file for complete search history.

(56) References Cited

U.S. PATENT DOCUMENTS

| | | | |
|---|---|---|---|
| 2008/0037175 A1 | 2/2008 | Horio | |
| 2008/0207865 A1* | 8/2008 | Blinzler | C08L 59/04 528/230 |

(Continued)

FOREIGN PATENT DOCUMENTS

| | | |
|---|---|---|
| EP | 1679346 A1 | 7/2006 |
| JP | 06-128343 A | 5/1994 |

(Continued)

OTHER PUBLICATIONS

Machine translation of WO 0200789 A1 (Year: 2002).*

(Continued)

*Primary Examiner* — Doris L Lee
(74) *Attorney, Agent, or Firm* — Faegre Drinker Biddle & Reath LLP

(57) ABSTRACT

The present invention relates to a method for the production of a colored polyoxymethylene copolymer by mixing a raw polyoxymethylene copolymer in particulate form, comprising 2 to 30% by weight of unreacted residual monomers, with a coloring agent in particulate form, in a degassing apparatus. In addition, the present invention relates to the colored polyoxymethylene copolymer obtainable by the process and the use of the colored polyoxymethylene copolymer for the production of molding parts.

14 Claims, 1 Drawing Sheet

(56) References Cited

U.S. PATENT DOCUMENTS

2008/0234459 A1 9/2008 Lang et al.
2015/0034882 A1 2/2015 Inagaki et al.

FOREIGN PATENT DOCUMENTS

| JP | H11241000 A | 9/1999 |
| JP | 2004-131641 A | 4/2004 |
| JP | 2009-506155 A | 2/2009 |
| JP | 2011-074396 A | 4/2011 |
| WO | WO 02/00789 | * 1/2002 |

OTHER PUBLICATIONS

International Preliminary Examination Report for PCT/EP2019/061880 mailed May 12, 2020.
International Search Report for PCT/EP2019/061880 mailed Aug. 8, 2019.
Written Opinion of the International Searching Authority for PCT/EP2019/061880 mailed Aug. 8, 2019.

* cited by examiner

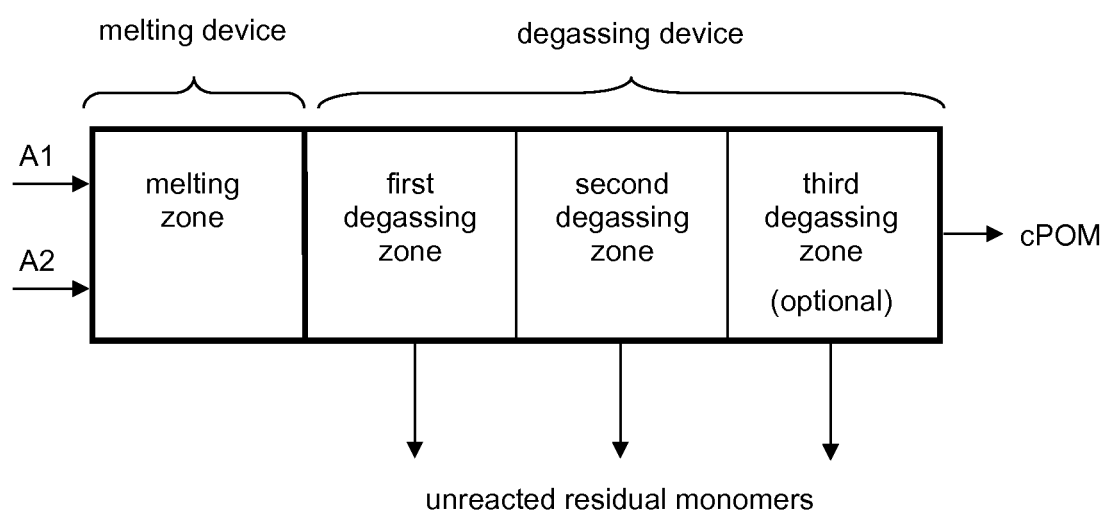

METHOD FOR THE PRODUCTION OF A COLORED POLYOXYMETHYLENE COPOLYMER

CROSS-REFERENCE TO RELATED APPLICATIONS

This application is a national stage application (under 35 U.S.C. § 371) of PCT/EP2019/061880, filed May 8, 2019, which claims benefit of European Application No. 18171636.6, filed May 9, 2018 both of which are incorporated herein by reference in their entirety.

The present invention relates to a method for the production of a colored polyoxymethylene copolymer by mixing a raw polyoxymethylene copolymer in particulate form, comprising 2 to 30% by weight of unreacted residual monomers, with a coloring agent in particulate form, in a degassing apparatus.

In addition, the present invention relates to the colored polyoxymethylene copolymer obtainable by the process and the use of the colored polyoxymethylene copolymer for the production of molding parts.

Polyoxymethylene copolymers have been known for a long time. The polymers have a number of outstanding properties, so that they are suitable for wide variety of industrial applications. Polyoxymethylene copolymers can be obtained by cationic polymerization of the cyclic oligomers of formaldehyde and the comonomer/s in the present of a catalyst and optionally an activator.

The polymerization reaction is typically carried out in a melt kneader. After the polymerization reaction, a raw polyoxymethylene copolymer is obtained which comprises a significant amount of unreacted residual monomers. Moreover, generally the raw polyoxymethylene copolymer contains instable end groups at the chain ends of the polyoxymethylene copolymer.

Therefore, in the production methods described in the state of the art, the raw polyoxymethylene copolymer is thermally treated in order to remove the unreacted residual monomers and, moreover, in order to depolymerize instable end groups. Subsequently, the thermally treated polyoxymethylene copolymer is dried, deodorized and the finished polyoxymethylene copolymer is stored in a silo in pelletized form.

The finished polyoxymethylene copolymer (hereinafter also referred to as "polyoxymethylene copolymer" or "POM") is used for the production of moldings for example in the automotive and sanitary ware industry. The polyoxymethylene copolymers obtained by the production methods described in the state of the art is uncolored which is suitable for the production of uncolored moldings.

For the production of colored moldings in the state of the art, the finished polyoxymethylene copolymer in particulate form is mixed with a coloring agent in conventionally designed processing machines like extruders. In the state of the art, the colored polyoxymethylene copolymer can be obtained in particulate form and can afterwards be used for the production of colored moldings. Another process described in the state of the art for the production of colored polyoxymethylene copolymer moldings is the use of a conventionally designed processing machine to which a colorant metering facility has been added. The finished polyoxymethylene copolymer is mixed in the processing machine with the colorant and fed to an injection mould to obtain the colored molding.

The properties of the colored polyoxymethylene copolymers of the prior art as well as the moldings obtained from the colored polyoxymethylene copolymers of the prior art are not satisfactory for demanding applications in all cases. Often the molding does not show a satisfactory homogeneous distribution in the obtained moldings. Moreover, in some cases the colored moldings show insufficient formaldehyde emission. It is therefore an object of the present invention to provide a method for the production of a colored polyoxymethylene copolymer which does not retain the disadvantages of the prior art or only in diminished form. The moldings obtained from the colored polyoxymethylene copolymer should show a homogeneous distribution of the coloring agent and a brilliant color. Moreover, the moldings should exhibit a low formaldehyde emission. The process for the production of the colored polyoxymethylene copolymer, moreover, should be cost efficient and simple.

This object is achieved by method for the production of a colored polyoxymethylene copolymer comprising the following steps:

a) providing a component (A1) and a component (A2), wherein
    component (A1) contains a raw polyoxymethylene copolymer in particulate form, comprising a polyoxymethylene copolymer and 2 to 30% by weight of unreacted residual monomers with regard to the total weight of the raw polyoxymethylene copolymer, and
    component (A2) contains a coloring agent in particulate form, b) simultaneously feeding components (A1) and (A2) to a degassing apparatus, in which the raw polyoxymethylene copolymer is melted and mixed with component (A2), and whereby the unreacted residual monomers are at least partially removed from the raw polyoxymethylene copolymer to obtain the colored polyoxymethylene copolymer, c) removing the colored polyoxymethylene copolymer from the degassing apparatus.

It has surprisingly be found that colored polyoxymethylene copolymers (cPOM) can be produces by mixing raw polyoxymethylene copolymer (rPOM) in particulate form, comprising unreacted residual monomers with a coloring agent in a degassing apparatus. By the method for the production of colored polyoxymethylene copolymers the colored polyoxymethylene copolymers can be obtained in a simple and cost efficient way. Moreover, moldings made from the colored polyoxymethylene copolymer obtained by the inventive method show a homogeneous distribution of the coloring agent and thereby a brilliant color. The obtained moldings, moreover, surprisingly show a low formaldehyde emission.

The present invention will be described more detail hereinafter.

A BRIEF DESCRIPTION OF THE FIGURE

FIG. 1 illustrates a degassing apparatus according to the invention.

RAW POLYOXYMETHYLENE COPOLYMER (RPOM): COMPONENT (A1)

In step a) component (A1) containing raw polyoxymethylene copolymer (rPOM) is provided.

Raw polyoxymethylene copolymers (rPOMs) are known per se. The copolymers are preferably prepared by polymerization of trioxane (as monomer) and one or more comonomers.

Quite generally, the polyoxymethylene copolymer (POM) contained in the raw polyoxymethylene copolymer (rPOM) in component (A1), has at least 50 mol % of —CH$_2$O-recurring units in the main polymer chain and up to 50 mol %, preferably from 0.01 to 20 mol %, in particular from 0.1 to 10 mol % and very particularly preferably from 0.5 to 6 mol %, of recurring units of the formula (I)

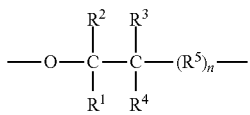
(I)

where R$^1$ to R$^4$ are each, independently of one another, a hydrogen atom, a C$_1$-C$_4$-alkyl group or a alkoxy-substituted alkyl group having from 1 to 4 carbon atoms and R$^5$ is a —CH$_2$—, —CH$_2$O—, a C$_1$-C$_4$-alkyl- or C$_1$-C$_4$-alkoxy-substituted methylene group or a corresponding oxymethylene group and n is from 0 to 3.

In a further embodiment, the polyoxymethylene copolymer (POM) contained in the raw polyoxymethylene copolymer (rPOM) in component (A1), has at least 50 mol % of —CH$_2$O-recurring units in the main polymer chain and up to 50 mol %, preferably from 0.01 to 20 mol %, in particular from 0.1 to 10 mol % and very particularly preferably from 0.5 to 6 mol %, of recurring units of the formula (I)

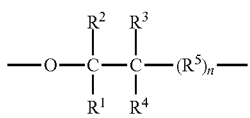
(I)

where R$^1$ to R$^4$ are each, independently of one another, a hydrogen atom, a C$_1$-C$_4$-alkyl group or a alkoxy-substituted alkyl group having from 1 to 4 carbon atoms and R$^5$ is a chemical bond, a —CH$_2$—, —OCH$_2$—, a C$_1$-C$_4$-alkyl- or C$_1$-C$_4$-alkoxy-substituted methylene group or a corresponding oxymethylene group and n is from 0 to 3.

These groups can advantageously be introduced into the copolymers by ring opening of cyclic ethers as comonomers. Preferred cyclic ethers (comonomers) are those of the formula (II)

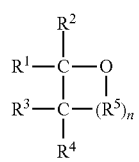
(II)

where R$^1$ to R$^5$ and n are as defined above. Merely by way of example, mention may be made of ethylene oxide, 1,2-propylene oxide, 1,2-butylene oxide, 1,3-butylene oxide, 1,3-dioxane, 1,3-dioxolane and 1,3-dioxepane (=butanediol formal, BUFO) as cyclic ethers and linear oligoformals or polyformals such as polydioxolane or polydioxepane as comonomers.

Likewise suitable are oxymethylene terpolymers which are prepared, for example, by reaction of trioxane, one of the above-described cyclic ethers of the formula (II) and a third monomer, preferably a bifunctional compound of the formula (III) and/or (IV)

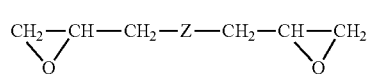
(III)

and/or

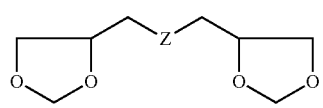
(IV)

where Z is a chemical bond, —O—, —ORO— (R is C$_1$-C$_8$-alkylene or C$_3$-C$_8$-cycloalkylene).

Preferred comonomers of this type are ethylene diglycide, diglycidyl ether and diethers derived from glycidyls and formaldehyde, dioxane or trioxane in a molar ratio of 2:1 and also diethers derived from 2 mol of glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to name only a few examples.

The melting point of the polyoxymethylene copolymer (POM) contained in the raw polyoxymethylene copolymer (rPOM) in component (A1) has at least may preferably be in the range of from 150 to 200° C., more preferably the melting point is in the range of from 160 to 180° C. These melting points are determined with a heating and cooling rate of 20 K/Min according to DIN EN ISO 11357-3 (year 2013-04) and a sample weight of about 8.5 mg.

The molecular weight of the polyoxymethylene copolymer (POM) contained in the raw polyoxymethylene copolymer (rPOM) (weight-average Mw; determined as described below) can be adjusted within a wide range. The molecular weight M$_w$ preferably be in the range of from 10 000 to 240 000 g/mol±10%, while the number-average molecular weight M$_n$ (determined as described below) may preferably be in the range of from 8 000 to 85 000. Preferably, the polyoxymethylene copolymer (POM) contained in the raw polyoxymethylene copolymer (rPOM) has a molecular weight (Mw) in the range of from 80 000 to 220 000 g/mol±10%, while its molecular weight (M$_n$) is in the range of from 9 000 to 38 000 g/mol. The Mw/Mn ratio (Polydispersity Index) of the polyoxymethylene copolymer (POM) contained in the raw polyoxymethylene copolymer (rPOM) is preferably in the range of from 1.4 to 14, the Mw/Mn is more preferably in the range of from 2.1 to 14.

The molecular weights of the polymers were determined via size-exclusion chromatography in a SEC apparatus (size exclusion chromatography). This SEC apparatus was composed of the following combination of separating columns: a preliminary column of length 5 cm and diameter 7.5 mm, a second linear column of length 30 cm and diameter 7.5 mm. The separating material in both columns was PL-HFIP gel from Polymer Laboratories. The detector used comprised a differential refractometer from Agilent G1362 A. A mixture composed of hexafluoro isopropanol with 0.05% of potassium trifluoro acetate was used as eluent. The flow rate was 0.5 ml/min, the column temperature being 40° C. 60 microliters of a solution at a concentration of 1.5 g of specimen per liter of eluent were injected. This specimen solution had been filtered in advance through Millipor Millex GF (pore width 0.2 micrometers). Narrowly distributed PMMA standards from PSS (Mainz, DE) with molecular weight M from 505 to 2.740.000 g/mol were used for calibration. Polydispersity index is defined as the weight average molecular weight divided by the number average molecular weight.

In a further embodiment, the molecular weights of the polymers were determined via size-exclusion chromatography in the following SEC apparatus (size exclusion chromatography): This SEC apparatus was composed of the following combination of separating columns: a preliminary column of length 5 cm and diameter 8 mm, a second linear column of length 30 cm and diameter 7.5 mm and a third column of length 30 cm and diameter 7.5 mm. The separating material in column 1 was HFIP-LG Guard, and PL-HFIP gel for column 2 and 3. The detector used comprised a differential refractometer from Agilent 1100. A mixture composed of hexafluoro isopropanol with 0.05% of potassium trifluoro acetate was used as eluent. The flow rate was 1 ml/min, the column temperature being 35° C. 50 microliters of a solution at a concentration of 1.5 g of specimen per liter of eluent were injected. This specimen solution had been filtered in advance through Millipor Millex GF (pore width 0.2 micrometers). Narrowly distributed PMMA standards from PSS (Mainz, DE) with molecular weight M from 800 to 2.200.000 g/mol were used for calibration. Polydispersity index is defined as the weight average molecular weight divided by the number average molecular weight.

The molecular weight distribution of the polyoxymethylene copolymer (POM) contained in the raw polyoxymethylene copolymer (rPOM) may be monomodal or essentially monomodal. It may also have a multimodal molecular weight distribution. It may be possible that rPOM has a bimodal molecular weight distribution.

For the production of the raw polyoxymethylene (rPOM) the polymerization generally is carried out in the presence of at least one Lewis acid. The Lewis acid generally functions as initiator or catalyst for the polymerization. The term "at least one Lewis acid" in the present case, is understood to mean exactly one Lewis acid and also mixtures of two or more Lewis acids.

Thereby it may be preferred that it is carried out in the presence of two, more preferred one Lewis acid.

The at least one Lewis acid may preferably be at least one, e.g. two, more preferred one halogenide of boron, tin, titanium, phosphorous, antimony or arsenic. Thereby it may be preferred that the halogenide is a chloride or fluoride or that the halogenide contains both. Examples thereof are boron trifluoride, tin tetrachloride, titanium tetrachloride, phosphorus pentafluoride, phosphorous pentachloride, antimony pentaflouride and arsenic pentafluoride, and especially also their complex compounds.

The at least one Lewis acid may preferably be at least one halogenide of boron, in particular boron trifluoride, e.g. boron trifluoro hydrate, or at least one, more preferred one coordination compound of boron halogenide and at least one, more preferred one organic compound comprising at least one oxygen or sulfur atom or both. Thereby it may be more preferred that the organic compound comprises only at least one, in particular one oxygen atom. Said organic compound to form a coordination compound of boron halogenide may for instance be an alcohol, ether or sulfide. Among the at least one coordination compounds of boron halogenide the coordination compound with an ether, in particular an alkyl ether, such as a C1 to C4 alkyl ether may be most preferred. The coordination compound of boron trifluoride with an ether, in particular an dialkyl ether, such as a C1 to C4 dialkyl ether may be most preferred, in particular inter alia, boron trifluoride dibutyl etherate, boron trifluoride diethyl etherate or boron trifluoride dimethyl etherate or a mixture thereof. Boron trifluoride diethyletherate may most preferably be used.

The amount in which the at least one Lewis acid may be used in the process disclosed herein is not specifically limited. Typically, the amount of the at least one Lewis acid may be of from 10 to 150 ppm, such as 20 to 140 ppm, in either case based on the total weight of the monomers and comonomers. It may be preferred to use the at least one Lewis acid in an amount of from 30 to 130 ppm, based on the weight of at least one monomer. In particular it may be advantageous to use the at least one Lewis acid in an amount of from 40 to 100 ppm, based on the total weight of the monomers and comonomers. Lower amounts may lead to slower reaction initiation and higher amounts usually do not lead to a faster reaction and possibly incur high efforts in separating the Lewis acid from the polymer in the end.

Generally, the polymerization can be carried out using diverse methods. Such methods are, either known to the person skilled in the art or are accessible to him by application of his general knowledge. It may be preferred that rPOM is produced via cationic polymerization. During cationic polymerization, rPOM can be formed in bulk (i.e. without or essentially without solvent).

The polymerization may be carried out at temperatures, pressures and in equipment generally known to the person skilled in the art or accessible to him by application of his general knowledge. For instance, it may be performed in an extruder or a cascade of two or more extruders such as of twin-screw type, such as of the self-cleaning type. It may also be possible to carry out the process disclosed herein in a kneader or a cascade of two or more kneaders, such as of the self-cleaning type. Generally, it may be advantageous to carry out the polymerization at temperatures as low as possible in order to avoid waste of energy and at temperatures high enough to sustain the polymerization and to ensure good blending, in particular by way of sustaining the at least one monomer and if present also the at least one comonomer in the liquid state. Thus, it may be preferred to carry out the polymerization at a temperature of from 50 to 150° C., whereby temperatures of from 60 to 120° C. may be more preferred. Thereby the temperatures refer to the temperature in the bulk.

In general, it may be advantageous to deactivate the Lewis acid when the polymerization reaction is finished.

Thereby it may be preferred to add at least one deactivating agent. It may be more preferred to add two or most preferred to add one deactivating agent. The at least one deactiving agent may for instance be ammonia, an aliphatic amine, such as triethylamine, tri-n-butylamine, triethanolamine, a quaternary ammonium salt such as tetrabutyl ammonium hydroxide, a hydroxide, an inorganic weak acid salt, or organic acid salt of an alkali metal or alkaline earth metal.

The at least one deactivating agent may be added neat or be added as a solution in an organic solvent. The latter may be more effective in terms of stopping the polymerization reaction and therefore preferred. The organic solvent used in this case, may be an aliphatic hydrocarbon, such as n-hexane, cyclohexane or n-heptane or an alcohol such as methanol or ethanol or a ketone such as acetone or methyl ethyl ketone or an ester.

The amount of the at least one deactivating agent, generally depends on the equivalents of active sites in the deactivating agent and the equivalents in the at least one Lewis acid to be deactivated; thus, for instance the equivalents of nitrogen and boron atoms. The at least one deactivating agent may be used advantageously in a molar excess to the at least one Lewis acid, such as from 50:1 to at least 2:1.

The raw polyoxymethylene copolymer (rPOM) can optionally comprise at least one additive selected from the group consisting of antioxidants, formaldehyde scavengers, UV-absorbents, mold-release agents, acid scavengers, and nucleating agents.

The above mentioned additives maybe added before, during or after the polymerization. Preferably the additives are added to the raw polyoxymethylene copolymer (rPOM) after the polymerization and after adding the deactivating agent. The additives can be added in any known device. The additives are preferably added in a mixing device.

Suitable antioxidants are for example sterically hindered phenols, such as triethylene glycol bis(3-tert-butyl-4-hydroxy-5-methylphenyl)propionate, for example Irganox 245 of BASF SE. In case an antioxidant is used, it is added in such an amount that the colored polyoxymethylene copolymer (cPOM) comprises from 0.001 to 10% by weight, preferably from 0.002 to 5% by weight, more preferred from 0.005 to 3% by weight antioxidant(s) based on the total weight of colored polyoxymethylene copolymer (cPOM).

Suitable formaldehyde scavengers are for example condensates of melamine and formaldehyde and polyamides. In case a formaldehyde scavenger is used, it is added in such an amount that the colored polyoxymethylene copolymer (cPOM) comprises from 0.001 to 10% by weight, preferred from 0.002 to 5% by weight, more preferred from 0.005 to 3% by weight formaldehyde scavenger(s) based on the total weight of colored polyoxymethylene copolymer (cPOM).

Suitable polyamides are for example copolyamides based on caprolactam, hexamethylenediamine, p,p'-diaminodicyclohexylmethane and adipic acid, which can further comprise monofunctionally polymerizing compounds such as propionic acid or triacetonediamine as components to regulate the molar mass. Examples are Ultramid® 1C and Ultramid® C31 from BASF SE. In case a polyamide is used, it is added in such an amount that the colored polyoxymethylene copolymer (cPOM) comprises from 0.001 to 2% by weight, preferably from 0.005 to 1.99% by weight, more preferably from 0.01 to 0.08% by weight of polyamide(s) based on the total weight of colored polyoxymethylene copolymer (cPOM).

Suitable UV absorbants are for example hindered amines light stabilizer such as a hindered amine of the polymeric structure, wherein n is an integer in the range of 5 to 50,

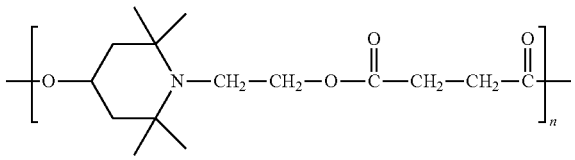

In case a hindered amine is used, it is added in such an amount that the colored polyoxymethylene copolymer (cPOM) comprises from 0.001 to 10% by weight, preferred from 0.002 to 5% by weight, more preferred it may be of from 0.005 to 2% by weight of hindered amine(s) based on the total weight of colored polyoxymethylene copolymer (cPOM).

Suitable mold-release agents are for example esters or amides of saturated or unsaturated aliphatic carboxylic acids having from 10 to 40 carbon atoms, preferably from 16 to 22 carbon atoms, with polyols or aliphatic saturated alcohols or amines having from 2 to 40 carbon atoms, preferably from 2 to 6 carbon atoms. In case an ester or amide is used, it is added in such an amount that the colored polyoxymethylene copolymer (cPOM) comprises from 0.01 to 5% by weight, preferably from 0.09 to 2% by weight and in particular from 0.1 to 0.7% by weight mold-release agents, based on the total weight of colored polyoxymethylene copolymer (cPOM). Preferred esters or amides are accordingly glyceryl distearate, glyceryl tristearate, ethylenediamine distearate, glyceryl monopalmitate, glyceryl trilaurate, glyceryl monobehenate and pentaerythrityl tetrastearate.

Suitable acid scavengers are, for example, alkaline or earth alkaline carbonates, hydroxides or silicates. In case an acid scavenger is used, it is added in such an amount that the colored polyoxymethylene copolymer (cPOM) comprises from 0.001 to 2% by weight, preferably from 0.002 to 1% by weight, and particularly from 0.003 to 0.7% by weight, based on the total weight of the colored polyoxymethylene co-polymer (cPOM).

Suitable nucleation agents are, for example, melamine cyanurate, silica acid, branched polyoxymethylene and talcum. In case a nucleation agent is used, it is added in such an amount that that the colored polyoxymethylene copolymer (cPOM) comprises from 0.005 to 5% by weight, preferably from 0.01 to 2% by weight, and particularly from 0.02 to 0.7% by weight, based on the total weight of the colored polyoxymethylene co-polymer (cPOM).

If present the additives are added in a customary manner, for example individually or together, as such, as a solution or suspension, as a masterbatch.

In step a) component (A1) is provided in particulate form. After the polymerization and optionally after the addition of additives, therefore, the raw polyoxymethylene copolymer (rPOM) can for example be grinded in order to obtain the raw polyoxymethylene copolymer (rPOM) in particulate form. If the raw polyoxymethylene copolymer (rPOM) is grinded the raw polyoxymethylene copolymer (rPOM) is obtained in powder form. The particles then have an irregular form, the particle size of the component (A1) is then for example in the range of 10 μm to 2 mm. The mean particle size is determined by using a Mastersizer 3000, using Fraunhofer diffraction.

In order to provide the component (A1) in particulate form every known mill maybe suitable. Examples for especially suitable mills are for example a roller mill or a bar mill.

Coloring Agent: Component (A2)

In step a), moreover, component (A2) is containing a coloring agent is provided.

The coloring agent maybe a coloring agent of any color. Within the context of the present invention, however, component (A2) preferably contains at least one black coloring agent. At least one black coloring agent in the present case is understood to mean exactly one black coloring agent and also mixtures of two or more black coloring agents. The at least one black coloring agent preferably is selected from the group consisting of carbon black, activated carbon, carbon nanotubes, graphene black, nigrosine, and perylene dyes. Preferred black coloring agents are selected from the group consisting of carbon black and activated carbon, wherein carbon black is especially preferred. The coloring agent maybe provided in pure form, generally in pulverized form or in form of a compactat. In this embodiment component (A2) consists of the coloring agent.

In a preferred embodiment, component (A2) is provided in form of a masterbatch, wherein the coloring agent is dispersed in a polymer, wherein the polymer forms the continuous phase and the coloring agent forms the disperse phase.

In a more preferred embodiment as a polymer for the masterbatch a polyoxymethylene copolymer (POM) is used. In an even more preferred embodiment as a polymer for the masterbatch the polyoxymethylene copolymer (POM) is used, which forms the basis for the colored polyoxymethylene copolymer (cPOM) which is produced by the inventive method.

Preferably component (A2) contains a coloring agent and a polyoxymethylene copolymer (Masterbatch). More preferably, component (A2) contains 5 to 30% by weight of the aforementioned at least one black coloring agent and 95 to 70% by weight of polyoxymethylene copolymer.

The masterbatch can be produced for example in extruder, wherein the coloring agent is mixed with the polymer. Preferably, the black coloring agent is carbon black and the polymer is a polyoxymethylene copolymer.

In a preferred embodiment the component (A2) is provided in form of granules. The particle size of the granules preferably is in the range of 2 to 3 mm. The particle size is determined as described above for the particle size determination of component (A1).

Degassing Apparatus

The degassing apparatus preferably comprises in the direction of flow a melting device and a degassing device.

Melting Device

The melting device comprises at least one melting zone. At least one melting zone within the context of the present invention means exactly one melting zone as well as two or more melting zones. Preferably the melting device contains exactly one melting zone. In this preferred embodiment the melting device equals the melting zone.

The melting device is operated at a temperature from 130 to 220° C., preferably from 150 to 210° C. and most preferred from 150 to 200° C. As a melting device every known device maybe used which is capable to melt and mix the components (A1) and (A2). It is clear that in the melting device only the meltable components are melted. If the coloring agent is carbon black for example, the skilled person understands, that the carbon black is only dispersed but not melted. The same holds true, if component (A1) contains unmeltable additives like fillers or reinforcement agents.

The energy for the operation of the melting device at temperatures of from 130 to 220° C. results from friction. Therefore, in a preferred embodiment the melting device does not need to be externally heated.

In the melting device no vacuum is applied. The preferred one melting zone of the melting device contains in a preferred embodiment in the direction of flow a conveying element, kneading element, optionally a mixing element and a flow-restricting element. Preferably the melting device is carried out as an extruder. In this case, the melting device comprises in the direction of flow conveying element, a kneading element, optionally a mixing element and a flow-restricting element. Suitable conveying elements, kneading elements, mixings elements and flow-restricting elements are known to the person skilled in the art.

Conveying element serve for the onward transport of the components comprised within the extruder. The shear rate acting on the components in the extruder via the conveying elements is typically smaller than the shear rate acting on the components in the extruder via kneading elements or via mixing elements. Suitable conveying elements are known to the person skilled in the art and are by way of example screw conveying elements, preferably twin screw conveying elements.

Kneading elements serve for the mixing of the individual components comprised in the extruder. At the same time, they may comminute by way of example the coloring agent, carbon black or the additives, like for example fillers or reinforcing agents.

The shear rate acting on the components in the extruder via the kneading elements is usually higher than the shear rate acting in the components via mixing elements and via conveying elements. Suitable kneading elements are known to the person skilled in the art and are by way of example kneading screws. More preferred are twin screw kneaders.

Mixing elements serve for the mixing of the individual components comprised in the extruder. The shear rate acting on the components in the extruder via the mixing elements is usually smaller than the shear rate acting on the components via kneading elements. Suitable mixing elements are known to the person skilled in the art and are by way of example two mixing elements or screw mixing elements. Preferred mixing elements are twin screw mixing elements.

Flow-restricting elements are unlike conveying elements in having reverse conveying effect, and thus restrict the flow of the components comprised in the extruder. Flow-restricting elements usually used are conveying elements mounted in such a way that their direction of conveying is opposite to the direction of flow.

An extruder can be defined by the following parameters:
d is the diameter of the extruder screws,
N is the rotation rate of the extruder screw and
Δ is the width of the gap between the exterior wall of the screw (screw tip) and the internal wall of the extruder.

The diameter (d) of the screws in the melting device is usually in the range of 70 to 360 mm, preferably in the range of 120 to 250 mm and with particular preference in the range of 150 to 230 mm.

The rotation rate (N) of the screws in the melting device is by way of example in the range of 80 to 200 rpm, preferably in the range of 110 to 180 rpm and with particular preference in the range of 130 to 160 rpm.

The width (Δ) of the gap in the melting device is usually in the range of 3 to 12 mm, preferably in the range of 4 to 8 mm.

In the melting device the wall of the melting device, preferably the wall (casing) of the extruder, preferably the twin screw extruder, is closed. By consequence, in the melting device no vacuum is applied. As there are no devices through which gaseous components can be drawn off. The melting device has preferably a screw diameter in the range of 70 to 360 mm.

The quotient of the length (L) of the melting device (preferably the melting zone, if the melting device equals melting zone) to the diameter (d) of the extruder screws of the melting device (preferably the melting zone, if the melting device equals the melting zone) L/d is generally from 3 to 10.

In the melting device the components (A1) and (A2) are melted at temperatures as described above. The above mentioned temperatures are measured at the casing of the extruder.

In step b) components (A1) and (A2) are preferably fed simultaneously to the melting zone of the degassing apparatus. Preferably they are simultaneously fed in particulate form to the melting zone of the degassing apparatus. Component (A2) is preferably fed to the melting zone of the degassing device in such an amount that the colored polyoxymethylene copolymer (cPOM) contains the coloring agent in an amount of 0.01 to 2% by weight, preferably in the range of 0.01 to 1.5% by weight, more preferably in the range of 0.05 to 1.0% by weight and most preferably in the range of 0.1 to 0.3% by weight, based on the total weight of the colored polyoxymethylene copolymer (cPOM).

Preferably, the components (A1) and (A2) are simultaneously fed to the melting device of the degassing apparatus.

In a preferred embodiment, in the direction of flow, the melting device is the foremost part of the degassing apparatus. Preferably, the melting device of the degassing apparatus consists of one melting zone. Generally, the components (A1) and (A2) are fed to the melting zone via a feed section, which is not part of the degassing apparatus.

Degassing Device

The degassing device comprises generally viewed in the direction of flow, a first degassing zone, a second degassing zone and optionally a third degassing zone. In a preferred embodiment the degassing device comprises viewed in the direction of flow, a first degassing zone, a second degassing zone and an third degassing zone.

Preferably, the degassing device of the degassing apparatus consists of a first degassing zone, a second degassing zone and a third degassing zone. Therefore, another object of the present invention is a method for the production of a colored polyoxymethylene copolymer, wherein the degassing apparatus consists of a melting device, which consists of melting zone, and a degassing device, which consists of a first degassing zone, a second degassing zone and a third degassing zone.

The first degassing zone generally comprises in the direction of flow a conveying element, optionally a kneading zone, a mixing element and a flow-restricting element. For the conveying element, the kneading element, the mixing element and the flow-restricting element in the first degassing zone the above made description for the melting device (the melting zone) apply accordingly. The same holds true for the preferred embodiments.

Therefore, the conveying element, the mixing element and the flow-restricting element in the first degassing zone preferably carried out as twin screw extruders.

The first degassing zone is preferably carried out as a twin screw extruder. The twin screw extruder of the first degassing zone can be defined by the following parameters:

The aforementioned parameters d, N and Δ of the first degassing device are as follows:

The diameter (d) of the screws in the first degassing zone is usually in the range of 70 to 360 mm, preferably in the range of 120 to 250 mm and with particular preference in the range of 150 to 230 mm.

The rotation rate (N) of the screws in the first degassing zone is by way of example in the range of 80 to 200 rpm, preferably in the range of 110 to 180 rpm and with particular preference in the range of 130 to 160 rpm.

The width (Δ) of the gap in the first degassing zone is usually in the in the range of 3 to 12 mm preferably in the range of 4 to 8 mm.

The quotient of the length (L) of the first degassing zone to the diameter (d) of the extruder screws of the first degassing zone L/d is generally from 3 to 15.

The first degassing zone is operated at temperatures of from 155 to 270° C., preferably from 160 to 240° C. and in particular from 170 to 230° C. The first degassing zone is preferably operated at a pressure from 0.1 mbara to 10 bara, preferably from 10 mbara to 2 bara, in particular from 10 mbara to 1 bara, and most particularly from 10 mbara to 400 mbara.

Within the context of the present invention "bara" means the absolute pressure (bar absolute). The absolute pressure bara is 0-referenced against the perfect vacuum, using an absolute scale. Usually bara is equal to a gauge pressure+ atmospheric pressure.

The first degassing zone of the degassing device has a volume of the gaseous phase in the range of 80 to 20% by volume, preferably from 70 to 30% by volume and more preferably 50 to 40% by volume. The volume of the gaseous phase is defined as follows:

volume of the gaseous phase=available volume in the first degassing zone−available volume of the melt in the first degassing zone In the above mentioned formula, the available volume is defined as follows:

available volume=volume inside the casing of the first degassing zone−volume of the elements contained in the first degassing zone (conveying element, optionally kneading element, mixing element and flow-restricting element)

Preferably the first degassing zone is carried out as a twin screw extruder as described above. The casing of the twin screw extruder preferably contains one or more degassing openings in order to apply a vacuum to the first degassing zone. In the first degassing zone instable end groups of the raw polymethylene copolymer (rPOM) are depolymerized. The reaction products of the depolymerized end groups are gaseous and are drawn off through the one or more degassing openings of the first degassing zone.

Therefore, a vacuum is applied to the first degassing zone. In the first degassing zone at least 50 mol-%, more preferably 60 mol-% and in particular at least 70 mol-% of the instable end groups are depolymerized and drawn off, based on the total mol-amount instable end groups contained in the raw polymethylene copolymer (rPOM). The depolymerization product (formaldehyde) is drawn off through the one or more degassing openings of the first degassing zone. In the first degassing zone, moreover, unreacted residual monomers are drawn off. The unreacted residual monomers contain trioxane and formaldehyde.

The at least partial depolymerized melt is transported from the first degassing zone to the second degassing zone.

The setup of the second degassing zone essentially equals the setup of the first degassing zone. However, the screw design of the elements, the temperature, the pressure and the vacuum might be varied. The parameters d, N, Δ and L/d of the second degassing zone are in the ranges defined above for the first degassing zone. These parameters for the second degassing zone can be the same as for the first degassing zone or they can be varied, as long as these parameters stay in the above defined ranges.

The volume of the gaseous phase in the second degassing zone is preferably in the range of 70 to 30% by volume, more preferably, in the range of 50 to 30% by volume, wherein the volume of the gaseous phase is defined as described above for the first degassing zone, respectively.

In the second degassing zone the remaining instable end groups are depolymerized and drawn off through the one or more degassing openings.

Moreover, in the second degassing zone unreacted residual monomers are drawn off through the one or more degassing openings. The residual monomers are typical trioxane and formaldehyde, which, moreover, can comprise formals of α-ω-hydroglycols which may be substituted in the cc-chain.

In the second degassing zone at least 50%, preferably at least 75%, more preferably at least 85% and particularly at least 95% of the unreacted residual monomers are removed, based on the total amount of residual unreacted monomers contained in the raw polyoxymethylene copolymer (rPOM).

The setup of the third degassing zone essentially equals the setup of the first degassing zone. However, the screw design of the elements, the temperature, the pressure and the vacuum might be varied. The parameters d, N, Δ and L/d of the third degassing zone are in the ranges defined above for the first degassing zone. These parameters for the third degassing zone can be the same as for the first degassing zone or they can be varied, as long as these parameters stay in the above defined ranges.

The volume of the gaseous phase of the third degassing zone is preferably in the range of 30 to 0% by volume, preferably in the range of 10 to 0% by volume. At the end of the third degassing zone, the volume of the gaseous phase is preferably 0. The volume of the gaseous phase in the third degassing zone is defined as aforementioned for the first degassing zone.

In another preferred embodiment, the first degassing zone of the degassing device has a volume of the gaseous phase in the range of 80 to 20% by volume, the second degassing zone of the degassing device has a volume of the gaseous phase in the range of 70 to 30% by volume and the third degassing zone of the degassing device has a volume of gaseous phase in the range of 30 to 0% by volume.

The depolymerized and at least partially degassed melt is preferably transported from the second degassing zone to the third degassing zone.

In the third degassing zone the remaining residual unreacted monomers are removed through the one or more degassing openings.

A preferred setup for a degassing apparatus is described in FIG. 1.

Behind the third degassing zone, which preferably forms the rearmost part of the degassing device, and preferably of the degassing apparatus, according to step c), the colored polyoxymethylene copolymer (cPOM) is removed from the degassing apparatus.

In a preferred embodiment, the colored polyoxymethylene copolymer (cPOM) is subsequently granulated. Therefore, the colored polyoxymethylene copolymer (cPOM) is preferably fed from the third degassing zone to a granulator. More preferably, the colored polyoxymethylene copolymer (cPOM) is fed from the third degassing zone to a melt pump (preferably to a gear pump) and afterwards through a melt filter and subsequently to the granulator.

According to step (c) the colored polyoxymethylene copolymer (cPOM) is removed from the degassing apparatus, preferably from the third degassing zone of the degassing device. Generally, after the third degassing zone the colored polyoxymethylene copolymer (cPOM) is granulated.

The granulated colored polyoxymethylene copolymer (cPOM) can optionally be dried and deodorized. Subsequently, the colored polyoxymethylene copolymer (cPOM) is stored in a silo.

Another object of the present invention is the colored polyoxymethylene copolymer (cPOM) obtained by the inventive method.

The colored polyoxymethylene copolymer (cPOM) typically contains 60 to 99.9% by weight of at least one polyoxymethylene copolymer,
0.01% to 2% by weight of at least one coloring agent and optionally,
0 bis 39.99% by weight of at least one additive selected from the group consisting of antioxidants, formaldehyde scavengers, UV-absorbents, mold-release agents, acid-scavengers, and nucleation-agents.

Another object of the present invention is the use of the colored polyoxymethylene copolymer (cPOM) obtained by the inventive method, for the production of molded parts. The inventive use leads to molded parts which show a homogeneous distribution of the coloring agent and therefore a very brilliant color. Moreover, the inventive use leads to moldings which show a low formaldehyde emission.

The present invention is illustrated below by reference to examples, without limitation thereto.

Analytical Methods

Weight Loss $N_2$ (Determination of the Weight Loss Under Nitrogen Atmosphere)

For testing the heat stability, the weight loss at 222° C. under $N_2$ is determined. It is the weight loss in percent of a weighed sample of about 1.2 g of pellets on heating for 2 h at 222° C. under nitrogen. After cooling, the sample is weighed again, and the weight loss is calculated.

MVR (DIN EN ISO 1133-1:2012-03)

The melt volume-flow rate (MVR) is determined by extruding molten material from the cylinder of a plastometer through a die of specified length and diameter under preset conditions of temperature (190° C.) and load (2.16 kg or 10 kg).

Residual Formaldehyde Content (GC Headspace Chromatography)

The residual formaldehyde content in colored polyoxymethylene copolymer pellets was determined by Headspace Gas Chromatography. A Capillary gas chromatograph (GC 7890 B, Agilent) equipped with autosampler (PAL COMBI-xt, CTC Analytics), thermal conductivity detector and a fused silica capillary (Polydimethylsiloxane, DB-1, Agilent) with Helium as carrier gas was used. 3.00 g of the test item was weighed into a 20 ml headspace vial which was filled with argon before. Then the vial was sealed tightly with a septum cap. The vial was kept 30 min at 140° C. Afterwards, 500 µl of gas volume was injected using a split ratio of 15:1.

Oven temperature: 40° C. isothermal for 5 min
40° C.→200° C., 8 K/min
200° C. isothermal for 2 min The amount of formaldehyde was calculated based on the detector signal (peak area in mVs) of formaldehyde and a calibration curve. The calibration curve was performed by means of total evaporation of 5 stock solutions of formaldehyde in ethanol. The formaldehyde content is given relative to the dry weight of the pellets (µg/g=ppm).

Formaldehyde Emission (According VDA 275, 1994 Edition, Jul. 1, 1994)

The manufacture of specimen (test sample) was carried out as follows: In an injection molding machine (Arburg Allrounder 320M), colored polyoxymethylene copolymer pellets are formed into injection molded plates (40×100×2.5 $mm^3$, cold-runner, 1-cavity). The injection molding machine is operated with the following parameters: mass temperature: 200° C., tool wall temperature: 90° C.; screw diameter: 30 mm, screw speed: 170 1/min, injection speed: 50 mm/sec. The test samples are stored before examination in a PE-bag for 1 day.

For the determination, the specimens are fixed over distilled water in a sealed (closed) 1-L polyethylene bottle at constant temperature (60° C.) for 3 hours. Afterwards the 1-L polyethylene bottle is cooled and the formaldehyde content in the distilled water is determined as follows. A photometric analysis using the so-called acetylaceton method is applied. Therefore, the formaldehyde is converted to diacetyldihydrolutidine using acetylacetone and ammonium acetate. The concentration of the diacetyldihydrolutidine is measured photometrically (the maximum of absorption of diacetyldihydrolutidine is at 412 nm).

The formaldehyde content is given in ppm, calculated by dividing formaldehyde in mg to the dry weight of the specimen in kg.

Molecular Weight Determination by Size Exclusion Chromatography

The molecular weights of the polymers were determined via size-exclusion chromatography in a SEC apparatus (size exclusion chromatography). This SEC apparatus was composed of the following combination of separating columns: a preliminary column of length 5 cm and diameter 8 mm, a second linear column of length 30 cm and diameter 7.5 mm and a third column of length 30 cm and diameter 7.5 mm. The separating material in column 1 was HFIP-LG Guard, and PL-HFIP gel for column 2 and 3. The detector used comprised a differential refractometer from Agilent 1100. A mixture composed of hexafluoro isopropanol with 0.05% of potassium trifluoro acetate was used as eluent. The flow rate was 1 ml/min, the column temperature being 35° C. 50 microliters of a solution at a concentration of 1.5 g of specimen per liter of eluent were injected. This specimen solution had been filtered in advance through Millipor Millex GF (pore width 0.2 micrometers). Narrowly distributed PMMA standards from PSS (Mainz, DE) with molecular weight M from 800 to 2 200 000 g/mol were used for calibration. Polydispersity index is defined as the weight average molecular weight divided by the number average molecular weight.

Mean Particle Size

Volume based mean particle size (Dv50) in mm was determined by using a Mastersizer 3000.

Residual Monomer Content in Wt % in Regard to the Total Weight of the Raw Polyoxymethylene Copolymer (rPOM)

The residual monomer content in raw polyoxymethylene copolymer (rPOM) was determined by extraction of 50 g of sample in a soxhlet extractor in chloroform for 6 hours. The chloroform extract was analyzed by gas chromatography using FID (flame ionization detection). The content of formaldehyde, 1,3,5-trioxane and 1,3-dioxolane was determined by applying calibration curves using corresponding reference samples. The residual monomer content in wt %, given in table 1, is the sum of formaldehyde, 1,3,5-trioxane, and 1,3-dioxolane in regard to the total weight of the raw polyoxymethylene copolymer (rPOM).

Content of Carbon Black in %

The content of carbon black was determined by incineration of 3.0 g of sample at 625° C. for 9 min according DIN EN ISO 3451-1:2008. The carbon black content in % is calculated based on the determined residue after incineration relative to the sample amount times 100.

Molding of Black Colored Specimens for Gloss and Color Measurement

The manufacture of specimen (test sample) was carried out as followed: In an injection molding machine (Arburg Allrounder 320M), the colored polyoxymethylene copolymer pellets are formed into injection molded plates (60× 60×2 mm³, cold-runner, 2-cavity). The injection molding machine is operated with the following parameters: mass temperature: 200° C., tool wall temperature: 90° C.; screw diameter: 30 mm, screw speed: 100 1/min, injection speed: 90 mm/sec.

Gloss of Molded Plagues

The gloss of black colored molded plaques was measured according ISO 2813:2014 (=DIN EN ISO 2813:2015) using a "Byk-Gardner Haze-Gloss" apparatus. By using a reflecting measuring mode, the determined gloss values on the sample surface correlate with the visual gloss impression. The gloss of the sample is determined by the ratio of the gloss of the sample to a polished black glass plate with fixed refractive index (1.567 at 587.6 nm wave-length) times 100. The measuring angle was 60°, which is suitable for semi-glossy surfaces like injection molded plaques.

Color of Molded Plaques

The color of molded plaques was determined according DIN 53236:2018. DIN 53236:2018 describes the conditions of measurement and evaluation for the determination of color differences for plastics. The color coordinates X, Y, Z of the specimens are measured and transferred to the CIE 1976 L*a*b* color space. The CIE 1976 L*a*b* color space is specified in ISO 11664-4:2008. Method B of DIN 53236 was used to measure the color coordinates with the measuring geometry R45/0 with daylight D65-10, on a Byk-Gardner spectrophotometer Color-View and a backing of the specimens with a white standard.

Additives and Chemicals Used

Irganox 245 FF/Ethylenebis(oxyethylene)bis-(3-(5-tert-butyl-4-hydroxy-m-tolyl)-propionate) (CAS no. 36443-68-2), BASF SE Synthetic magnesium silicate (CAS no. 1343-88-0), PQ Corporation Talc (CAS no. 14807-96-6): Hydrous magnesium silicate, Mondo Minerals B.V.

EBS/N,N'-Ethylenedi-stearamide (CAS no. 110-30-5), Lonza Ltd.

$BF_3xOEt_2$, Boron trifluoride-diethylether, BASF SE

Triisopropanolamine (CAS no. 122-20-3), assay>99% by GC, BASF SE

Methylal, assay>99% by GC, Lambiotte Cie s.a.

Calcium hydroxide (assay>90%) and ethyl acetate (assay>99% by GC), purchased by local chemical distributor)

Preparation of Raw Polyoxymethylene Copolymer (rPOM): Component (A1)

For the preparation of raw polyoxymethylene copolymer, 96.5% by weight of 1,3,5-trioxane and 3.5% by weight of 1,3-dioxolane were used, based on the total amount of the used monomers. As solvent 1 wt.-% of ethyl acetate relative to 1,3,5-trioxane was used. 85 ppm $BF_3xOEt_2$ based on 1,3,5-trioxane was used to start the polymerization and dimethoxymethane was used as molecular weight regulating agent. The polymerization was carried out in a kneader reactor at a polymerization temperature profile from 60 to 80° C. At the outlet of the reactor 400 ppm tri-iso-propanolamine, relative to 1,3,5-trioxane, is added as 10 wt.-% solution in ethyl acetate to stop the polymerization. The raw POM is milled and transported with nitrogen to a storage vessel. The rPOM was characterized as followed.

TABLE 1

Characterization of rPOM; component (A1)

| rPOM | A1a | A1b |
|---|---|---|
| Mean particle size (Dv50) in mm | 0.45 | 0.51 |
| Residual monomer in wt-% | 4.5 | 4.0 |
| $M_w$ in kg/mol | 151 | 136 |

To the raw polyoxymethylene copolymer (rPOM) from table 1 the following additives were added, relative to 105 parts of rPOM, and homogenously mixed: 0.01 parts Ca(OH)$_2$, 0.35 parts Irganox 245 FF; 0.15 parts N,N'-Ethylenedi-stearamide, 0.05 parts talc and 0.05 parts synthetic magnesium silicate.

Coloring Agent: Component (A2)

Component (A2) was used as carbon black master batch, with limited pellet shape, size 2-3 mm. Carbon black master batch was produced by melt kneading of 79.92 wt.-% of polyoxymethylene copolymer (MVR=25 cm$^3$/10 min according to ISO 1133 at 190° C./2.16 kg) with 20.0 wt.-% of carbon black beads and 0.08 wt.-% of potassium carbonate in a twin-screw extruder, ZS60MAXX under following conditions: barrel temperature 165-220° C., screw speed 400 rpm, total throughput of 400 kg/hr. The polymer melt leaving the twin-screw-extruder was pelletized using water-ring-pelletizer. In a final step the pellets were heated up by hot air to 120° C. for 4 hours for means of deodorization to obtain low level of residual volatile components especially formaldehyde in the final product. Carbon black, PRINTEX® F 80 beads (A2b) and PRINTEX®90 beads (A2a), was purchased from Orion.

TABLE 2

Characterization of the coloring agent; component (A2)

| Coloring agent | A2a | A2b |
|---|---|---|
| Type of carbon black | PRINTEX® 90 beads | PRINTEX® F 80 beads |
| MVR in cm$^3$/10 min according to ISO 1133 (190° C./10 kg) | 33 | 49 |
| Weight loss in % under N$_2$ (222° C./2 hr) | 2.5 | 1.4 |
| Residual formaldehyde content in ppm | 310 | 330 |
| Content of carbon black in % according to DIN EN ISO 3451 | 19.7 | 19.6 |

Preparation of the Colored Polyoxymethylene Copolymer (cPOM)

Inventive Examples 1-4

Raw polyoxymethylene copolymer (rPOM; component (A1)) including additives was added with a feed rate of 2000 kg/hr and the coloring agent (A2) was added with a feed rate of 20 kg/hr into barrel C1 of a twin-screw-extruder from JSW, with a total L/D of 56, a screw diameter d=196 mm. The twin-screw-extruder comprised the following defined zones as shown in table 3. On 1$^{st}$, 2$^{nd}$ and 3$^{rd}$ degassing zone a vacuum (p=40 mbara) is applied.

TABLE 3

Description of used twin-screw-extruder

| barrel number of extruder | C4 to C5 | C6 to C8 | C9 to C12 | C13 to C15 |
|---|---|---|---|---|
| L/D: | 7 | 14 | 14 | 10.5 |
| Function: | Melting zone | 1$^{st}$ degassing zone | 2$^{nd}$ degassing zone | 3$^{rd}$ degassing zone |

The polymer melt leaving the twin-screw-extruder was pelletized using a water-ring-pelletizer. In a final step the pellets are heated up by hot air to 140° C. for 6 hours for means of deodorization to obtain low level of residual volatile components especially formaldehyde in the final product.

TABLE 4

Parameters for producing colored polyoxymethylene copolymer (cPOM) and characterization of pellets (Examples 1 to 4)

| | Example 1 | Example 2 | Example 3 | Example 4 |
|---|---|---|---|---|
| rPOM (A1) | A1a | A1a | A1b | A1b |
| Coloring agent (A2) | A2a | A2b | A2a | A2b |
| Screw speed in rpm | 165 | 165 | 180 | 180 |
| Barrel Temperature in ° C. melting zone | 205-220 240-190 | 205-220 240-190 | 205-220 240-230 | 205-220 240-230 |
| first degassing zone | 185-140 | 185-140 | 190-150 | 190-150 |
| second degassing zone third degassing zone | 140-140 | 140-140 | 150-150 | 150-150 |
| MVR in cm$^3$/10 min according to ISO 1133 (190° C./2.16 kg) | 7.6 | 7.7 | 11.3 | 11.5 |
| Weight loss in % under N$_2$ (222° C./2 hr) | 0.18 | 0.20 | 0.19 | 0.18 |
| Residual formaldehyde content in ppm | 10 | 13 | 11 | 14 |

Comparative Examples 1a, 2a, 3a, 4a

The comparative examples 1a, 2a, 3a, 4a were produced by secondary compounding of finished uncolored polyoxymethylene copolymer in a twin-screw-extruder together with a coloring agent (A2).

Preparation of the Finished Uncolored Polyoxymethylene Copolymer.

In a first step, a finished uncolored polyoxymethylene copolymer was produced under identical conditions as A1a/Example 1 (POM UN (1)) and A1b/Example 3 (POM UN (3)), however without dosing of coloring agent (A2). The resulting properties are shown in table 5.

TABLE 5

Pellet properties of finished uncolored polyoxymethylene copolymer

| | POM UN (1) | POM UN (3) |
|---|---|---|
| Manufacturing conditions identical to, without dosing of coloring agent (A2) | A1a/Example 1 | A1b/Example 3 |
| MVR in cm$^3$/10 min according to ISO 1133 (190° C./2.16 kg) | 7.3 | 10.9 |

TABLE 5-continued

Pellet properties of finished uncolored polyoxymethylene copolymer

|  | POM UN (1) | POM UN (3) |
|---|---|---|
| Weight loss in % under $N_2$ (222° C./2 hr) | 0.14 | 0.16 |
| Residual formaldehyde content in ppm | 8 | 9 |

In a second step, 99 wt.-% of POM UN was melt kneaded with 1.0 wt.-% of a coloring agent (A2) in a twin-screw extruder, type ZSK90, under following conditions: barrel temperature from 140-210° C., screw speed 150 rpm, total throughput of 350 kg/hr. The polymer melt leaving the twin-screw-extruder was pelletized using water-ring-pelletizer. In a final step the pellets are heated up by hot air to 120° C. for 4 hours for means of deodorization to obtain low level of residual volatile components especially formaldehyde in the final product. The resulting materials were characterized as shown in table 6.

TABLE 6

Characterization of black colored pellets

|  | Comparative example 1a | Comparative example 2a | Comparative example 3a | Comparative example 4a |
|---|---|---|---|---|
| POM UN | (1) | (1) | (3) | (3) |
| Coloring agent (A2) | A2a | A2b | A2a | A2b |
| MVR in cm³/10 min according to ISO 1133 (190° C./2.16 kg) | 7.8 | 7.9 | 11.5 | 11.8 |
| Weight loss in % under $N_2$ (222° C./2 hr) | 0.27 | 0.25 | 0.24 | 0.22 |
| Residual formaldehyde content in ppm | 10 | 13 | 11 | 14 |

Comparative Examples 1b, 2b, 3b, 4b

The comparative examples 1b, 2b, 3b, 4b were produced by self coloring of finished uncolored polyoxymethylene copolymer from table 5 with coloring agent (A2) at the injection molding machine. Hence a homogenous dry-blend pellet mixture of 99 wt.-% of POM UN and 1.0 wt.-% of component (A2) was prepared as summarized in table 7.

TABLE 7

Dry-blend pellet mixtures of POM UN with coloring agent (A2)

|  | Comparative example 1b | Comparative example 2b | Comparative example 3b | Comparative example 4b |
|---|---|---|---|---|
| POM UN | (1) | (1) | (3) | (3) |
| Coloring agent (A2) | A2a | A2b | A2a | A2b |

Table 8 shows the final properties on molded parts of inventive examples 1-4, comparative examples 1a-4a and comparative examples 1b-4b.

TABLE 8

Properties measured on injection molded black colored specimens

|  | Inventive examples (primary compounding) | | | | Comparative examples 1a to 4a ($2^{nd}$ compounding step) | | | | Comparative examples 1b to 4b (self-coloring injection molding) | | | |
|---|---|---|---|---|---|---|---|---|---|---|---|---|
|  | 1 | 2 | 3 | 4 | 1a | 2a | 3a | 4a | 1a | 2a | 3a | 4a |
| Color L | 5.7 | 6.7 | 5.9 | 6.8 | 6.9 | 7.7 | 6.7 | 7.9 | 7.1 | 8.0 | 7.1 | 8.1 |
| Color a | −0.5 | −0.6 | −0.6 | −0.7 | −0.7 | −0.7 | −0.6 | −0.7 | −0.7 | −0.7 | −0.6 | −0.7 |
| Color b | −1.6 | −1.3 | −1.7 | −1.4 | −1.4 | −1.0 | −1.3 | −0.9 | −1.3 | −0.9 | −1.3 | −0.8 |
| Gloss | 83.9 | 84.0 | 84.9 | 85.2 | 82.1 | 82.2 | 83.0 | 83.2 | 81.8 | 81.7 | 82.4 | 82.3 |
| Formaldehyde emission in ppm according to VDA 275 | 19 | 21 | 16 | 17 | 25 | 26 | 22 | 21 | 20 | 20 | 17 | 16 |

Examples based on colored rPOM exhibit a lower L-value and higher gloss value compared to comparative examples 1a to 4a and 1b to 4b. Therefore, examples based on colored rPOM show a more intensive and more brilliant black color compared to comparative examples 1a to 4a and 1b to 4b. In addition, the inventive examples based on colored rPOM show low level of formaldehyde emissions.

Consequently, the inventive method provides a simple and cost-efficient way for the production of a colored polyoxymethylene copolymer. Furthermore, the moldings obtained from the colored polyoxymethylene copolymer exhibit outstanding deep and brilliant black color with low emission of formaldehyde.

The invention claimed is:

1. A method for the production of a colored polyoxymethylene copolymer comprising the following steps:
   a) providing a component (A1) and a component (A2), wherein
      component (A1) contains a raw polyoxymethylene copolymer in particulate form, comprising a polyoxymethylene copolymer and 2 to 30% by weight of unreacted residual monomers with regard to the total weight of the raw polyoxymethylene copolymer, and
      component (A2) contains a coloring agent in particulate form,
   b) simultaneously feeding components (A1) and (A2) to a degassing apparatus, in which the raw polyoxymethylene copolymer is melted and mixed with component (A2), and whereby the unreacted residual monomers are at least partially removed from the raw polyoxymethylene copolymer to obtain the colored polyoxymethylene copolymer, c) removing the colored polyoxymethylene copolymer from the degassing apparatus, wherein the degassing apparatus consists of a melting device, which consists of a melting zone, a degassing device, which consists of a first degassing zone, a second degassing zone and a third degassing zone, and wherein the degassing device is operated at a temperature of from 155 to 270° C. and a pressure of from 0.1 mbara to 10 bara, wherein the coloring agent is at least one black coloring agent selected from the group consisting of carbon black, activated carbon, carbon nanotubes, graphen black, black organic pigments and black organic dyes, and component (A2) is provided in form of a masterbatch.

2. The method according to claim 1, wherein the components (A1) and (A2) are simultaneously fed to the melting device of the degassing apparatus.

3. The method according to claim 1, wherein in direction of flow the melting device is the foremost part of the degassing apparatus.

4. The method according to claim 1, wherein at least the degassing device is carried out as a twin screw extruder.

5. The method according to claim 1, wherein the melting device is also carried out as a twin screw extruder.

6. The method according to claim 1, wherein the first degassing zone of the degassing device has a volume of gaseous phase in the range of 80 to 20% by volume, the second degassing zone of the degassing device has a volume of the gaseous phase in the range of 70 to 30% by volume and the third degassing zone of the degassing device has a volume of gaseous phase in the range of 30 to 0% by volume.

7. The method according to claim 1, wherein the melting device is operated at a temperature of from 130 to 220° C. without applying vacuum.

8. The method according to claim 1, wherein the melting device is operated at a temperature of from 150° C. to 200° C. without applying vacuum.

9. The method according to claim 1, wherein the degassing device is operated at a temperature of from 160 to 240° C. and a pressure of from 10 mbara to 2 bara.

10. The method according to claim 1, wherein the degassing device is operated at a temperature of from 170 to 230° C. and a pressure of from 10 mbara to 400 mbara.

11. The method according to claim 1, wherein the polyoxymethylene copolymer comprises at least 50 mol % of —$CH_2O$— recurring units and up to 50 mol %, of recurring units according to formula (I)

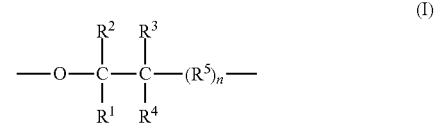

where $R^1$ to $R^4$ are each, independently of one another, a hydrogen atom, a $C_1$-$C_4$-alkyl group or a alkoxy-substituted alkyl group having from 1 to 4 carbon atoms and $R^5$ is a —$CH_2$—, —$CH_2O$—, a $C_1$-$C_4$-alkyl- or $C_1$-$C_4$-alkoxy-substituted methylene group of a corresponding oxymethylene group and n is from 0 to 3.

12. The method according to claim 1, wherein the polyoxymethylene copolymer comprises at least 50 mol % of —$CH_2O$— recurring units and from 0.01 to 20 mol % of recurring units according to formula (I)

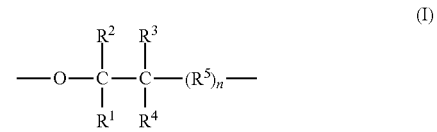

where $R^1$ to $R^4$ are each, independently of one another, a hydrogen atom, a $C_1$-$C_4$-alkyl group or a alkoxy-substituted alkyl group having from 1 to 4 carbon atoms and $R^5$ is a —$CH_2$—, —$CH_2O$—, a $C_1$-$C_4$-alkyl- or $C_1$-$C_4$-alkoxy-substituted methylene group of a corresponding oxymethylene group and n is from 0 to 3.

13. The method according to claim 1, wherein the polyoxymethylene copolymer comprises at least 50 mol % of —$CH_2O$— recurring units and from 0.5 to 6 mol % of recurring units according to formula (I)

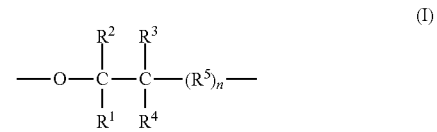

where $R^1$ to $R^4$ are each, independently of one another, a hydrogen atom, a $C_1$-$C_4$-alkyl group or a alkoxy-substituted alkyl group having from 1 to 4 carbon atoms and $R^5$ is a —$CH_2$—, —$CH_2O$—, a $C_1$-$C_4$-alkyl- or $C_1$-$C_4$-alkoxy-substituted methylene group of a corresponding oxymethylene group and n is from 0 to 3.

14. The method according to claim 1, wherein the unreacted residual monomers are trioxane, formaldehyde and/or formals of alpha-omega-hydroxyglycoles, which may be substituted in the C—C-chain.

* * * * *